L. H. NASH.
METER REGISTER.
APPLICATION FILED JUNE 2, 1906.

957,082.

Patented May 3, 1910.

UNITED STATES PATENT OFFICE.

LEWIS HALLOCK NASH, OF SOUTH NORWALK, CONNECTICUT, ASSIGNOR TO NATIONAL METER COMPANY, OF NEW YORK, N. Y., A CORPORATION OF NEW YORK.

METER-REGISTER.

957,082.  Specification of Letters Patent.  Patented May 3, 1910.

Application filed June 2, 1906. Serial No. 319,946.

*To all whom it may concern:*

Be it known that I, LEWIS HALLOCK NASH, a citizen of the United States, and a resident of South Norwalk, in the county of Fairfield and State of Connecticut, have invented a certain new and useful Improvement in Meter-Registers, of which the following is a specification.

My invention relates to meters and has particular application to certain improvements in water meters, and especially those of the type commonly known as magnetic meters.

The invention consists in the construction, combination and arrangement of parts set forth in and falling within the scope of the appended claims.

Figure 1:
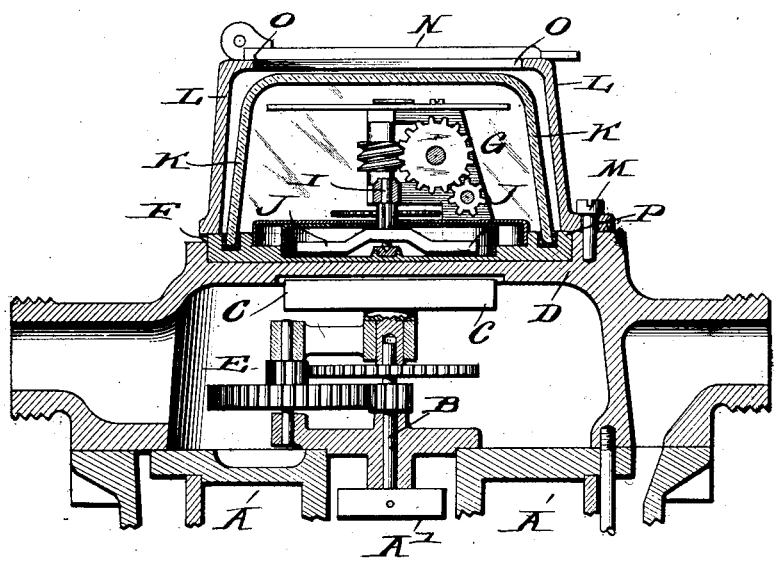
Figure 2:
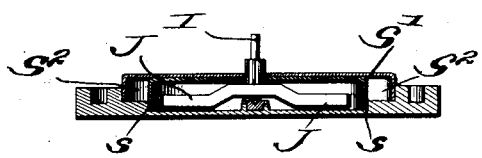
Figure 3:
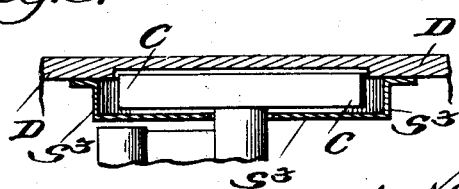

In the accompanying drawings wherein I have illustrated one embodiment of the invention, Figure 1 is a vertical, longitudinal sectional view taken through a magnetic water meter embodying the invention; Fig. 2 is a detail, sectional view showing one of the magnets and the means for annexing the same for the purpose hereinafter set forth; Fig. 3 is a view in cross section showing the application of the shield to the lower magnet of the meter.

Referring now to the accompanying drawings in detail, and particularly to Fig. 1 thereof, the letter A indicates the upper casing of the measuring chamber of a water meter, while A' is a vane or projection on the shaft B. A train of speed-reducing gears is shown at E and C is a permanent magnet in coöperation with and revolved by said gears. D is the upper casing made of diamagnetic material, as brass supporting the register mechanism case. The case of the register mechanism comprises a base F and a dome K of glass, or other suitable transparent material, hermetically sealed to said base. The register of the device is indicated at G and in the present instance is of the type commonly known as straight-reading. This register is driven by the shaft I, upon the lower end of which is affixed the permanent magnet J lying within the field of the magnet C and designed to be revolved under the influence of the magnet C to actuate the register mechanism in a well known manner. L is a protective cover made of magnetic material, as iron attached to the meter case by means of the screw M and provided with an opening O, and a lid or cover N. This covering forms a shoulder P over the base plate of the chamber containing the register mechanism and holds the same in place.

The mechanism above described forms the subject-matter of another application which I have filed under date of September 27, 1905, and which is serially numbered 280,260.

I have found by experience that the upper magnet J connected with and adapted to actuate the registering mechanism is liable to be unfavorably influenced by the magnetic lines of force passing through the protective coverings of the registering casing and through certain adjacent portions of the meter casing. In a word, if a magnet be placed adjacent to the meter in such manner that the magnetic lines will pass through the casings of the mechanism in a direction to intersect either the magnets J or C, such magnetic lines set up a force which interferes with the operation of the magnets. This affords an opportunity for evil-disposed persons to tamper with the registering mechanism and cause it to falsify the record. It is, therefore, desirable to provide some means for reducing, and, as far as possible, preventing extraneous magnetic lines of force intersecting said magnets and, particularly, magnet J, which is most injuriously affected thereby. To accomplish this it is necessary to provide some agency for conducting the lines of force around the magnet, and to accomplish this I have devised means which may be briefly enumerated as follows: The means consist of a magnetic shield composed of a plurality of layers of magnetic material with one or more intervening air spaces between them. The presence of an air space between two magnetic layers acts to condense into the outer layer all the lines of force which will readily pass and so leave but a relatively small number of magnetic lines to reach the inner shield. The inner shield being, for this reason, far below the condition of magnetic saturation, readily conducts said lines and prevents their passage into the space containing the magnet. The air space, therefore, performs an important function and the larger the air space the more protection is afforded. I have shown the magnetic shield as composed of suitable magnetic material, preferably iron. In the drawings the magnetic shield which, as aforesaid, is composed of a plurality of layers of magnetic material, is adapted to fit over the magnet J. In Figs. 1 and 2 I have shown the plurality of layers of magnetic material and in said figures S designates the inner layer of the shield of sufficient size to permit the magnet to revolve freely within the space it incloses, such layer being seated in a depression as shown at s. The second layer or cap S' of the shield is relatively larger than that shown at S and is adapted to partially envelop or incase the first-mentioned layer or cap being spaced apart therefrom to provide an intervening air space S². To similarly protect magnet C I may, if desired, provide this with a cap as shown in Fig. 3, said cap being indicated by the character s³, and covering and protecting the magnet in the same manner as the upper magnet is protected by the caps or layers S S'.

Having thus described my invention, what I claim is:

1. In a meter, the combination with a registering mechanism, of means for operating said mechanism including a magnet, and a magnetic shield composed of a plurality of layers of magnetic material, with an intervening air space between them, said shield inclosing said magnet.

2. In a meter the combination with a registering mechanism, of means for operating the latter including a magnet, and means for preventing the influencing of the magnet by unfavorable magnetic forces, said means including a protecting shield composed of a plurality of layers of magnetic material with an intervening air space between said layers, and a covering extending over said shield.

3. In a meter, the combination with the registering mechanism, a magnet therefor, a second magnet operating the first mentioned magnet, means for protecting the first mentioned magnet against unfavorable magnetic forces, such means comprising a shield formed of a plurality of layers of magnetic material with intervening air spaces between the layers.

In testimony whereof I have signed my name to this specification in the presence of two subscribing witnesses.

LEWIS HALLOCK NASH.

Witnesses:
W. A. PAULING,
JOS. J. PIERANDO.